United States Patent [19]

Nagasawa et al.

[11] 3,901,979

[45] Aug. 26, 1975

[54] PROCESS FOR PREPARING A LOW SODIUM INFANT FORMULA MIXTURE

[75] Inventors: Taro Nagasawa; Mamoru Tomita; Tadashi Watanabe; Tomokazu Obayashi, all of Tokyo, Japan

[73] Assignee: Morinaga Milk Industry Co., Ltd., Tokyo, Japan

[22] Filed: Jan. 3, 1974

[21] Appl. No.: 430,258

Related U.S. Application Data

[63] Continuation-in-part of Ser. No. 250,499, May 5, 1972, abandoned.

[30] Foreign Application Priority Data

Aug. 30, 1971  Japan............................. 46-65863

[52] U.S. Cl. .............. 426/613; 426/588; 426/801; 426/804
[51] Int. Cl. ............................................ A23c 11/00
[58] Field of Search ........... 426/186, 187, 189, 358, 426/359, 360, 362, 363, 364, 212

[56] References Cited
UNITED STATES PATENTS
2,998,315  8/1961  Peebles et al............... 426/357
FOREIGN PATENTS OR APPLICATIONS
46-10900  3/1971  Japan...................... 426/357

Primary Examiner—Joseph M. Golian
Attorney, Agent, or Firm—Oblon, Fisher, Spivak, McClelland & Maier

[57] ABSTRACT

A low sodium infant formula mixture which is dissolved in water to form a casein micelle having a degree of turbidity and a degree of heat stability approximate to cow's milk casein micelle and which contains a reduced sodium content can be obtained by dissolving a potassium salt of an organic acid and/or a potassium polyphosphate in an amount as determined by the formula:

$$\log y = 0.0384x + 0.70 \pm 0.25$$

wherein $y$ is the mg number of said potassium salt of the organic acid and/or the potassium polyphosphate per 1 g of casein protein and $x$ is the mg number of calcium ion per 1 g of casein protein, in a casein solution obtained by dissolving an acid casein in an alkali solution containing potassium, mixing therewith a calcium salt solution in an amount such that the concentration of calcium ion is from 20 to 40 mg per 1 g of casein protein at a temperature of below 50°C., adjusting the pH of the resulting mixed solution so that the pH of the mixed solution will be from 6.2 to 6.8 after subsequent preheating, gradually preheating the solution to a temperature of at least 65°C. while stirring to form a casein micelle, and adding an emulsifier, an animal or vegetable fat, a carbohydrate, such as lactose, and minor nutritional elements such as vitamins, to the casein micelle liquid, whereby the sodium content is less than 100 mg per 100 g of final product, and then homogenizing, pasteurizing, concentrating and drying the casein micelle liquid.

6 Claims, No Drawings

3,901,979

PROCESS FOR PREPARING A LOW SODIUM INFANT FORMULA MIXTURE

CROSS - REFERENCE TO RELATED APPLICATIONS

This is a continuation-in-part of Ser. No. 250,499, filed May 5, 1972, now abandoned.

BACKGROUND OF THE INVENTION

1. Field Of The Invention

The present invention relates to a process for preparing a low sodium infant formula mixture from an acid casein which is dissolved in water to form a casein micelle having a degree of turbidity and degree of heat stability similar to cow's milk casein micelle and which contains a reduced concentration of sodium. More particularly, the present invention relates to a process for preparing a low sodium infant formula mixture characterized by adding a potassium salt of an organic acid and/or a potassium polyphosphate in a particular amount, mixing a solution of calcium salt therewith at a temperature of below 50°C., adjusting the pH of the mixed solution so that the pH of the mixed solution after preliminary heating is from 6.2 to 6.8, preheating the solution to about 65°C. to form a casein micelle, and adding an animal or vegetable fat, emulsifier, carbohydrate, and minor nutritional elements such as vitamins, etc., to the casein micelle liquid, so that the sodium content is 100 mg per 100 g of final product, and then homogenizing, pasteurizing, and concentrating the micelle solution.

2. Description Of Prior Art

Sodium is present in an amount of 120 to 380 mg per 100 g of total solid content in mother's milk, about 460 mg per 100 g of total solid content in cow's milk, and 180 to 220 mg per 100 g of total solid content in commercially available infant formula mixture. However, a cow's milk or milk powder having lower sodium content is required for some patients.

Heretofore, commercially available low sodium cow's milk has been prepared by defatting a cow's milk and substituting potassium for sodium in the resulting skim milk, using an ion exchange resin to decrease the sodium ion content in the skim milk. (Die Molkerei Zeitung Welt der Milch, 18, 1103–1104 (1964) ). However, that process and the resulting product have proven to have a number of distinct disadvantges:

1. The potassium content in low sodium cow's milk is higher than twice that of normal cow's milk, so that it is nutritiously unsuited for infant patients suffering from cardiac insufficiency and renal insufficiency. (According to the above-mentioned literature, the potassium content in 0.95 l. of cow's milk is 1.31 g before being subjected to ion exchange treatment and increases to 2.36 g after ion exchange treatment.)

2. The commercially available low sodium cow's milk is poor in flavor because it is too high in potassium content;

3. The nutritiously important calcium content is reduced. Even if calcium is additionally added, the commercially available low sodium content cow's milk is poor in heat stability and the protein component can easily coagulate and precipitate during pasteurization or concentration.

Commercially available low sodium cow's milk, prepared by the above described prior art process, has a lower sodium content, but is high in potassium and has a high osmotic pressure. It has an unsuitable ash content, and it is not as nutritious as cow's milk.

4. The use of ion exchange resin to obtain the lowered sodium content is difficult, and the manufacturing costs are high.

5. The prior art low sodium cow's milk is available only in liquid form, and even if it is pasteurized, concentrated and dried, it is difficult to prepare a powdered product which has good flavor, solubility, dispersibility and sinkability characteristics.

U.S. Pat. No. 2,998,315 to D. Peebles discloses a process for preparing a low sodium content milk by the use of a combination of whey powder, which has been demineralized by contact with an ion exchange resin, and an acid casein dissolving solution. The process conditions are different from those of the present invention, particularly in the order and the quantity of the various salts added. These factors have a significant effect on the heat stability of the protein. Moreover, the calcium content of said low sodium content milk is an enormous value of about 322 mg/g of protein as calculated from the example. The mixed solution must be pasteurizeed, therefore, at the relatively low temperature of 143°F. for 30 minutes. Moreover, concentration of the solution is difficult, and spray drying techniques are required which can only be carried out with relatively low solid concentration solutions (about 11–12%). The result is a rather adverse solublility, sinkability, dispersibility and wettability of the final product.

Infants suffering from cardiac insufficiency, or renal insufficiency and adults suffering from hypertensions, require a low salt diet. Whereas adudlts can control their salt intake by proper selection of foodstuffs from various sources, the use of a low sodium formula mixture is indispensable to infants. (It is estimated that about 10% of all new born infants, equivalent to about 190,000 infants, suffer from cardiac insufficiency or renal insufficiency in Japan). The use of low sodium content infant formula is a significant part of the treatment of such disorders. It would be desirable, therefore, to provide an infant formula mixture which is low in sodium content and when contains a sufficient amount of necessary nutriments, at a moderate price.

A suitable low sodium infant formula must have the following characteristics: (1) It must be low in sodium content; (2) it must have an ash content, other than sodium, approximating that of mother's milk, or at least approximating commercially available infant formula mixtures; (3) it should have an agreeable flavor; and (4) it should have good water solubility, and the dissolved solution should be capable of being easily passed through the nipple of a nursing bottle or a catheter without interference from coagulated or precipitated protein; (5) it should have sufficiently high degree of heat stability so that the protein will not heat coagulate even if the powder is dissolved in water and pasteurized.

SUMMARY OF THE INVENTION

Accordingly, one object of the present invention is to provide a process for preparing a low sodium infant formula mixture which has a sodium content of less than 100 mg per 100 g of final product (i.e., less than half the sodium content of conventional infant formula mixtures), and desirably less than 50 mg/100 g., and which is characterized by a good balance of ash, other than sodium, good solubility, good turbidity and good heat stability, and which contains an appropriate amount of other nutriments.

The present invention is based on the process for preparing a casein powder as disclosed in copending U.S. application Ser. No. 185,662, filed Oct. 1, 1971, now abandoned.

The present process, however, is somewhat different from that disclosed in said copending applicatoin both in the reduced sodium ion content and in the addition of certain nutriments, such as animal or vegetable oils and fats, emulsifiers, carbohydrates, and minor elements such as vitamins, to a casein micelle liquid.

According to the present invention, a low sodium infant formula mixture which is dissolved in water to form a casein micelle having a degree of turbidity and a degree of heat stability approximate to cow's milk casein micelle and which contains a reduced sodium content can be obtained by dissolving a potassium salt of an organic acid and/or a potassium polyphosphate in an amount as determined by the formula:

$$\log y = 0.0384x + 0.70 \pm 0.25$$

wherein $y$ is the mg number of said potassium salt of the organic acid and/or the potassium polyphosphate per 1 g of casein protein and $x$ is the mg number of calcium ion per 1 g of casein protein, in a casein solution obtained by dissolving an acid casein in an alkali solution containing potassium, mixing therewith a calcium salt solution in an amount such that the concentration of calcium ion is from 20 to 40 mg per 1 g of casein protein at a temperature of below 50°C., adjusting the pH of the resulting mixed solution so that the pH of the mixed solution will be from 6.2 to 6.8 after subsequent preheating, gradually preheating the solution to a temperature of at least 65°C. while stirring to form a casein micelle, and adding an emulsifier, an animal or vegetable fat, a carbohydrate, such as lactose, and minor nutritional elements such as vitamins, to the casein micelle liquid, whereby the sodium content is less than 100 mg per 100 g of final product by the selection and the combination of materials containing little or no sodium, and then homogenizing, pasteurizing, concentrating and drying the casein micelle liquid.

DETAILED DESCRIPTION OF PREFERRED EMBODIMENTS

The process conditions of the present process have been determined based on the following considerations;

1. An organic acid salt or polyphosphate which is essentially free of sodium is added to an acid casein alkali solution which, likewise, is essentially free of sodium. The resulting solution is then reacted with a calcium salt solution to obtain a casein micelle liquid. The final product should contain less than 50 mg. of sodium per 100 g of product.

2. The casein micelle should have a turbidity O.D. of 1.20 to 1.64 when measured by the following method:

The casein micelle liquid is diluted with water so that its' content is 0.5%, and the optical density (O.D.) of the casein micelle liquid is spectrophotometrically measured at 610 m$\mu$ in a photoelectric colorimeter. The turbidity is expressed in terms of optical density.

3. The casein micelle liquid should have a degree of heat stability such that the amount of precipitation from the liquid is less than 0.2 ml. when measured by the following method:

The casein micelle liquid is diluted with water so that it contains a 3% protein content. It is then heated at 120°C. for 15 minutes. 50 ml. of the liquid so treated is placed into a centrifugal tube and is centrifuged at 1,000 rpm for 3 minutes. The heat stability is indicated in terms of amount of precipitate recovered.

The process will now be further described by discussing the following individual steps:

1. Preparation of the alkali solution of an acid casein;
2. Dissolution of potassium salt of organic acid and/or potassium polyphosphate;
3. Preparation and mixing of a calcium salt solution;
4. pH adjustment and preheating of the mixed solution;
5. Addition of an animal or vegetable fat, emulsifier, carbohydrate and minor elements, etc.;
6. Homogenization and pasteurization; and
7. Concentration and drying.

1. Preparation of the alkali solution of an acid casein; Suitable acid caseins which may be used include hydrochloric acid casein or lactic acid casein. Normally, a small mount of sodium will be contained in these acid caseins, but usually only in the amount of 0.38 to 0.62 mg per 1 g of protein which is about 1/30 to 1/40 of the sodium content contained in cow's milk (about 17 to 18 mg per 1 g of protein). Such acid caseins are therefore suitable for use in the present invention. The above described acid casein is added to warm water to effect sufficient swelling. It is then admixed with an alkali and heated to 60° to 70°C. to effect complete dissolution to form an alkaline solution of the acid casein (hereinafter referred to as the casein solution).

Although any potassium alkali compound can be used for htis purpose, particularly suitable potassium compounds include monopotassium phosphate, dipotassium phosphate, tripotassium phosphate, potassium hydroxide, potassium carbonate, etc. In general, the particular compound to be used for a given application will be selected based on such factors as its influence on flavor and ash content of the final product. Alkali agents containing sodium can also be used so long as the sodium is present in amounts of less than 100 mg sodium per 100 g of the final product.

The pH of the casein solution is an important element in the degree of heat stability of the casein micelle produced. It should be adjusted to a sufficiently high value, so that the pH of the mixed solution after subsequent preheating is within the range of 6.2 to 6.8.

The protein content of the casein solution is adjuted to 5 to 12% and the solution is cooled to a temperature of below 50°C. When the protein concentration is greater than 12%, the casein solution will have a viscosity such that in the subsequent addition of the calcium salt solution thereto, the protein will partially react with the calcium ion and a coagulated precipitate of the protein can be readily formed. Moreover, the more concentrated the solution, the more economical will be the concentration and drying steps. The protein should be present in a concentration of at least 5%.

If the temperature of the casein solution is less than 50°C., and a reasonable amount of salts are added to the casein solution in the above mentioned range of protein concentration, a coagulated precipitate of protein will not be formed by the addition of the calcium salt solution.

2. Addition of salts:

Next, one or more organic acid salts, for example, potassium salts of lactic acid, tartaric acid, succinic acid, citric acid, etc., or polyphohsphates, for example, potassium salts of pyrophosphoric acid, metaphosphoric acid, poly-meta-phosphoric acid, tetraphosphoric acid or the like are added to the casein solution. Of course, mixtures of organic acids salts and/or polyphosphates may be used together.

Salts containing sodium can also be used so long as the sodium content is less than 100 mg per 100 g of final product. In general, the particular salts to be used for a given application will be selected based on a consideration of such factors as their influence on ash content and flavor of the final product, and upon the preparation technique.

The addition of the above described salts will have an effect in preventing the formation of a protein coagulate when the casein micelle is produced and of maintaining the heat stablility and turbidity of casein micelle liquid. It is thus an indispensable requirement for obtaining the intended product.

The quantity of salts used will be closely related to the quantity of calcium ion added in the subsequent step. The more calcium ion introduced, the more salts will be required. The quantity of salts used can be calculated by the following formula:

$$\log y = 0.384 x + 0.70 \pm 0.25$$

wherein $y$ is the mg number of salts added per 1 g of protein and $x$ is the mg number of calcium ion added per 1 g of protein.

As will be described below, calcium ion should be introduced in an amount of 20 to 40 mg per 1 g of protein. When substituting these figures into the above formula, the values of $y$ will be as follows.

If the calcium ion is 20 mg, $y = 16.5$ to 52
If the calcium ion is 40 mg, $y = 96.9$ to 300.

The reason for limiting this range is as follows:

If the casein micelle produced contains less than 16.5mg of salts when 20 mg of calcium ion is introduced per 1 g of protein, then even if the pH of the casein micelle liquid, including the fats, emulsifier, carbohydrate, etc., is adjusted within the range of 6.20 to 6.80, the liquid will be characterized by poor heat stability. If the pH is adjusted to above 6.80 to maintain heat stability, the turbidity will be reduced, viscosity will be increased and it will be difficult to concentrate the mixed liquid.

On the other hand, if more than 52 mg. of salts are used to form the micelle, under the same conditions, the casein micelle liquid will be characterized by good heat stability, but even if the pH of the liquid is within the range of 6.20 to 6.80, the turbidity will be reduced and the viscosity will be increased. It therefore becomes difficult to concentrate the liquid, so that the final product is characterized by poor dispersibility, sinkability and wettability and will not be desirable from the point of view of nutrition, because of the large amount of salts contained. To increase the quantity of salts beyond this range, therefore, is meaningless, and could be detrimental. If 40 mg. of calcium ion per 1 g. of protein is introduced, the total amount of salts added should be within the range of 97 to 300 mg. If the salt content is beyond this range, a low content sodium powder which is good in solubility, good heat stability and having the proper degree of turbidity cannot be obtained.

3. Addition and mixing of calcium salt solution

Suitable calcium salts which may be used include calcium chloride, which is most desirable, and which can be used partially in combination with calcium gluconate. Other calcium salts include the difficulty soluble calcium phosphate, calcium sulfate, calcium carbonate, calcium citrate, etc.

The calcium salt solution should have a concentration of 10 to 30 mg., desirably 20 mg., of calcium ion per 1 ml. of solution. If the calcium ion concentration is lower than 10 mg./ml., the subsequent concentration procedure will be economically disadvantageous. On the other hand, if the concentration is greater than 30 mg./ml., a protein coagulate may be formed regardless of how vigorous the solution is stirred when the calcium salt solution is added to the casein-salt containing solution.

Since a protein coagulate may be formed if the calcium salt solution is mixed with the casein-salt containing solution at a temperature of over 50°C., it is necessary to maintain the temperature at below 50°C.

In general, the greater amount of salts added to the casein solution, the higher may be the temperatures used when mixing the casein solution with the calcium salt. The lower the calcium ion concentration in the calcium salt solution, the lower will be the quantity of calcium ion per 1 g. of protein. When using solutions having a lower protein content, the mixing temperature may be higher. However, the temperatures of over 50°C. should not be used. The calcium ion must be present in an amount of 1 g. of casein protein per 20 to 40 mg. If less than 20 mg. per 1 g. of protein is present, the casein micelle liquid will not only have a lower degree of turbidity, but its effect in reducing the viscosity will be slight. As a result, vigorous foaming of the liquid can occur during the concentrating step and coagulation can occur adjacent to the heating surface of the concentration causing concentration difficulties. The final product, therefore, is poor in dispersibility, sinkability and wettability and spray drying is required which requires lower degrees of concentration. If the quantity of calcium ion per 1 g. of protein exceeds 40 mg., the casein micelle liquid produced will not have a sufficiently high turbidity, even if the quantity of calcium ion is increased. Moreover, the viscosity of liquid will continue to be high and the heat stability of the casein micelle will be adversely affected.

For many application, the content of the final product is important, and often other ashes, in addition to calcium, magnesium and iron, are required. In those instances were necessary, magnesium chloride may be used as a magnesium-containing salt, and ferric chloride, ferrous lactate, etc. may be used as an iron-containing salt. In this instance, the total quantity of these cations and calcium ion must be within the range of 20 to 40 mg. per 1 g. of protein. The necessary amount of salts is calculated based on the above total amount.

4. pH adjustment and preheating

The mixed solution obtained by dissolving said salts into the casein solution and adding a calcium salt solution thereto, is preheated to a temperature of 65° to 80°C. The mixed solution will turn turbid white as the temperature is raised and the casein micelle will be produced. When the casein protein is mixed with the calcium ion, however, the pH of the mixture will be reduced before preheating by about 0.2 to 0.4. If the pH drops to below 6.0 after preheating, the protein will tend to easily coagulate and precipitate out. Therefore, the pH of the mixed solution should be adjusted prior to or during the preheating step, so that the pH of the casein micelle liquid after preheating will be 6.2 to 6.8. Any alkali agents used in the pH adjustment should not contain a detrimental quantity of sodium. The adjustment of the pH in combination with the addition of emulsifier is necessary to keep the micelle liquid in a heat stable state without coagulation or precipitation by the high temperature treatment during pasteurization.

5. Addition of fat, emulsifier, carbohydrate, and minor elements

From the point of view of nutritional requirements, various animal or vegetable fats, carbohydrates and minor elements, such as vitamins, etc. or other nutritive substances should be used with the casein micelle. Any animal and/or vegetable fats or oils as are commonly used in food products can be used for this purpose. The particular type of fat or oil, and the particular quantity used, of course, will depend upon the particular intended product and by nutritional requirements.

These additives are introduced after preheating. The fat or oil may be added directly into the casein micelle liquid at a temperature of 65° to 80°C, so that they are melted therein. Alternatively, the fat or oil can be first melted and then introduced into the casein micelle liquid in the molten form. Next, an emulsifier is added to the mixed micelle liquid to sufficiently emulsify the animal or vegetable fat or oil. Actually, the emulsifier provides the dual function of emulsifying the animal or vegetable fat or oil but also aids in the maintenance of heat stability.

The emulsifier may suitably be water soluble or fat soluble and any emulsifier as is commonly used for food products may be used, for example, glycerin fatty acid ester, sucrose fatty acid ester, sorbitane fatty acid ester, propylene glycol fatty acid ester, soy bean lecithin, etc. Soy bean lecithin is particularly desirable from the point of view of nutrition.

The emulsifier may be used in amounts of from 0.5 to 5% based on the higher content of either the protein or the fat in the final product. When the amount of emulsifier added is less than 0.5%, the animal and vegetable oil or fat will not be sufficiently emulsified and a sufficiently high heat stability cannot be maintained. Greater amounts of more than 5% are meaningless, since it does not increase its effectiveness.

Suitable carbohydrates which can be added to the casein micelle liquid include any of those carbohydrates which are commonly used for food products. However, in general, it is particularly desirable to use lactose, sucrose or maltodextrin, etc. The particular type and quantity of carbohydrate used will, of course, depend upon its nutritional value and upon its sodium content.

A low ash content whey, manufactured by the conventional ion exchange resin method, or by the use of an ion permselective membrane electrodialysis method, or by reverse osmosis, or skim milk, whole milk, demineralized cow's milk, soy bean powder or common whey can be partially blended into the liquid so long as the sodium content is less than 100 mg. per 100 g. of final product.

Minor elements such as vitamins, amino acids, etc. as are commonly used in infant formula preparations may also be appropriately added to the casein micelle liquid, if necessary. The mixed solution, thus obtained, is adjusted through each step so that the sodium content of the product is less than 100 mg., and most desirably below 50 mg., per 100 g. of final product.

6. Homogenizing and pasteurizing steps

After the animal or vegetable fat, or oil, an emulsifier, a carbohydrate and minor elements, such as vitamins, etc. which are not decomposed by heat, are added to the casein micelle liquid, it is homogenized. In order to sufficiently homogenize the casein micelle liquid, the solid content of the liquid should be adjusted to between 10 and 30%, preferably about 20%.

Homogenization is most conveniently carried out by means of a homogenizer as is commonly used in the food industry. Homogenization can occur at a temperature of 40° to 80°C, and a homogenizing pressure of 50 to 250 Kg/cm$^2$. Pasteurization is carried out under oxidizing pasteurizing conditions and most desirably by continuous pasteurization at an elevated temperature of about 130°C. and for a short time, say, 2 seconds.

7. Concentrating and drying steps

After pasteurization, the casein micelle liquid is concentrated and dried to form a powder. If the quantities of calcium ion, salts and emulsifier and the pH of the liquid are each within the above discussed ranges, concentrating and drying will proceed unhindered.

The presence of the fats, carbohydrates, etc. in the casein micelle liquid is desirable not only from a nutritional standpoint, but also from the point of view of appearance, solubility, dispersibility, wettability and sinkability. Moreover, a concentrated liquid having a solid content of 40 to 55% and a viscosity of between 30 and 70 cP (at 50°C.) can be prepared without difficulty, and this liquid can then be spray dried into the form of a powder.

The powder so obtained may have added vitamins which are decomposed by heating and many have other minor elements and carbohydrates, such as lactose, sucrose, etc. The sodium content, however, per 100 g. of final product is below 100 mg., and desirably below 50 mg.

According to the present invention, therefore, a low sodium infant formula mixture has been provided which is low in sodium content, balanced in ash content, and is characterized by good flavor, good solubility, good dispersibility, good sinkability and good wettability.

Further, according to the process of the present invention, the content of inorganic salts of sodium, potassium, calcium, magnesium, phosphorus, chlorine, iron, etc., and the contents of the salts of organic acids, such as lactic acid, citric acid, etc. and the respective ratios thereof can be varied over wide ranges and also the fat, protein, carbohydrate, etc. can also be varied over wide ranges. A composition can be prepared, therefore, which is appropriate for purposes of infants suffering from cardiac insufficiency or renal insufficiency or for elderly adults and young adults suffering from alcoholic cirrhosis, hypertension, gestational toxicosis, or the like.

When the composition is intended as part of the diet for infants and elderly adults, the powder should contain 200 to 400 mg. of calcium per 100 g. thereof. This quantity can be provided in the composition of the present invention, wherein the calcium is in easily digestible form.

The product of the present invention can be easily supplied in large quantities by utilizing low-priced casein and without the use of any special processing apparatus. The product is excellent in solubility and heat stability, and does not suffer from browning solidification, flavor deterioration, or the like, during storage. It can be prepared over long periods of time as compared with prior art modified milk powder.

Having now generally described the invention, a further understanding can be attained by reference to the following specific Examples, which are provided herein for purposes of illustration only and are not intended to be limiting in any manner unless otherwise so specified.

EXAMPLE 1

1.55 kg. of commercially available lactic acid casein (1.3 kg. as protein) having a composition of 84.0% in protein, 2.5% in ash, 12.0% in water, and 1.5% in others were added to about 10 kg. of water at about 50°C, and stirred to effect sufficient swelling. 44 g. of tripotassium phosphate and 40 g. of potassium carbonate were mixed and dissolved in water to form about a 10% solution. Thereafter the solution was added to the above described swollen acid casein solution and then the solution was heated to 75° to 80°C. to completely dissolve the casein. The concentration of the casein solution was adjusted by adding water to make up 13 kg. in total weight. It was then cooled to 20°C. The casein solution thus obtained had a protein concentration of 10% and a pH of 6.6.

In the present example, 20 mg. of calcium ion, 2 mg. of magnesium ion and 0.5 mg. of iron ion (ferrous lactate was used as an iron containing compound), 22.5 mg. of ions in total, were added thereto. A potassium citrate solution was prepared by dissolving 40.23 g. of commercially available food quality citric anhydride and 43.13 g. of commercially food quality potassium carbonate in water to form about a 10% solution. It was then boiled to release carbon dioxide and cooled to below 50°C. The citrate solution was added to the above described casein solution. Therefore, 65 g. of potassium citrate was added and about 50 mg. per 1 g. of protein. After adding the potassium citrate solution, the mixed casein solution was cooled to 20°C.

Next, 95.55 g. of food quality calcium chloride ($CaCl_2 \cdot 2H_2O$), 21.76 g. of food quality magnesium chloride ($MgCl_2 \cdot 6H_2O$), and 3.35 g. of food quality ferrous lactate ($C_6H_{10}O_6Fe \cdot 3H_2O$) were dissolved in water to prepared 1,300 ml. in total amount. This calcium salt solution contained 20 mg./ml. of calcium ion, 2 mg./ml. of magnesium ion and 0.5 mg./ml. of iron ion, 22.5 mg./ml. in total. The temperature was 16°C. The total amount of calcium salt solution was gradually added to the casein solution, and mixed with the above described potassium citrate solution, while stirring. This mixed solution was added to the calcium salt solution and gradually heated to 70°C. The casein solution became turbid white to form a casein micelle. The casein micelle liquid was 1.58 (O.D.) in turbidity and 6.35 (at 20°C.) in pH.

A 1.3 kg. of refined pure vegetable fat was melted on a water bath and 46 g. of soy bean lecithin (manufactured by Ajinomoto Co., Ltd.) in an amount corresponding to 2% of the fat was added thereto as an emulsifier to sufficiently disperse the soy bean lecithin in the fat. Thereafter, the dispersion was added to the above described casein micelle liquid. 4.25 kg. of commercially available food quality lactose (lactose purity 99.5%) was weighed and dissolved in water at about 65°C. so as to yield a 40% concentration. It was then added to the casein micelle liquid. The sodium content in the lactose used was 32.7 mg./100 g., and the sodium content in the water used in the present example was 1.3 mg./100 g. Minor elements as follows were added:

| Class | Purity | Amount added |
|---|---|---|
| Vitamin A Oil | One Million IU/g | 0.15 g. |
| Vitamin $B_2$ | Moisture content 2.5% | 0.1 g. |
| Vitamin $B_{12}$ | 80 γ/ml as an aq. soln. | 2.5 ml. |
| Vitamin $D_3$ | 64,000 IU/g | 0.781 g. |
| Vitamin E Oil | Total tocopherol 0.8 g/g | 0.938 g. |
| Nicotinamide | Moisture content 0.1 % | 0.609 g. |
| Folic acid | Moisture content 0.5 % | 0.01 g. |

Next, the casein micelle liquid mixed with each nutriment was homogenized to disperse the fats and fat soluble vitamins in two steps at a temperature of 65°C. and at a homogenizing pressure of 150 kg/cm$^2$ and 50 kg/cm$^2$ by means of a two-step homogenizer, according to conventional methods.

The homogenized liquid was adjusted to a solid content of 20% and it was then pasteurized at 130°C. for 2 seconds by a plate type pasteurizer.

Following pasteurization, the pH was found to be 6.28 and the liquid was free of curd. As the result of centrifugal tests, it was found that the pasteurized liquid (protein concentration about 3.2%) was in such a very good state that the quantity of precipitate centrifuged was below 0.05 ml. The degree of turbidity was a satisfactory 1.65 (O.D.). After pasteurization, the plate pasteurizer was disassembled and its heating surface was observed. No coagulation was observed to adhere to the heating surface, and the state was the same as that of pasteurized whole milk, skim milk, etc.

The casein micelle liquid after pasteurization was concentrated to a solid content of about 45% and a viscosity (at 50°C.) of 26 cP by means of a plate type concentrator, by conventional methods.

During the concentration procedure, foaming was reduced and the resulting product had almost the same viscosity as evaporated whole milk. Moreover, no adherence of protein coagulate, milk stone, etc. was found on the heating surface of concentrator.

The concentrated liquid was then spray dried at a hot air inlet temperature of 160°C. and at an air discharge temperature of 85°C. by means of a centrifugal spray drier. The powder obtained had a moisture content of 2.2%, and the yield was 7.6 kg.

1.02 kg. of cane sugar, 0.65 kg. of dextroglucose powder and minor elements of vitamin A acetate (0.185 g.), vitamin $B_1$ nitrate (0.046 g.), vitamin $B_6$ (0.001 g.), vitamin C (2.34 g.), calcium pantothenate (0.146 g.), cystine (2.79 g.), etc. were mixed with 7.6 kg. of the powder.

The final product had the following analytical values in general composition and ash content:

General composition, %:
| | |
|---|---|
| Fat | 23.2 |
| Protein | 12.9 |
| Carbohydrate and others | 60.2 |
| Ash | 1.7 |
| Moisture | 2.1 |

Ash composition, mg/100 g:

-Continued

| Na | 22.7; | Ca | 272; | P | 184; |
|----|-------|-----|------|----|------|
| K | 720; | Mg | 28; | Cl | 565. |

The final product had the same solubility as commercially available infant formula mixtures, but there was no formation of protein coagulate even when a 15% solution was boiled at 100°C. for 20 minutes. The final product also had other similar properties as commonly available infant formula mixtures.

When administrating the low sodium infant formula mixture prepared in the present example to an infant patient suffering from edma for congenital cardiac insufficiency, the powder showed such a remarkable effect that the body weight of the patients increased. The balance and content of the inorganic ions in the serum returned to normal conditions, and the edema disappeared. Moreover, the necessity of using a diuretic was eliminated.

EXAMPLE 2

About 9.4 kg. of low sodium infant formula mixture was obtained in the same manner as in Example 1, with the exception that 4 g. of sodium hydroxide, 32 g. of tripotassium phosphate and 40 g. of potassium carbonate were used when dissolving lactic acid casein. Also, 39 g. of potassium polyphosphate was substituted for potassium citrate, and milk fat was partially substituted for vegetable fat. 1.71 kg. of vegetable fat and 0.82 kg. of milk fat (fat content 84%) were used.

The final product had the following general composition (%) and ash content (mg./100 g.):

| Fat | 23.1% |
|-----|-------|
| Protein | 13.0 % |
| Carbohydrate and others | 60.0 % |
| Ash | 1.65 % |
| Moisture | 2.25 % |
| Calcium | 275 mg/100 g |
| Sodium | 48 mg/100 g |
| Potassium | 574 mg/100 g |
| Magnesium | 28 mg/100 g |
| Chlorine | 562 mg/100 g |
| Phosphorus | 227 mg/100 g. |

The casein micelle liquid in the present example had a turbidity of 1.55 (O.D.), a pH of 6.42 (at 20°C.). The pasteurized liquid had a pH of 6.30 and a turbidity of 1.66 (O.D.) and was characterized by good heat stability. The concentrated liquid had a solid content of 46% and a viscosity (at 50°C.) of 35 cP. it was observed that no coagulate adhered to the apparatus. A centrifugal test showed only a very small, below 0.05 ml., quantity of precipitate, so that the product had good heat stability. The final product was similar in general properties to the commercially available infant formula mixture as in Example 1.

When this composition was used as a low sodium infant formula with good results, the sucking state of the patients improved and the body weight of the patients showed a significant increase. The balance and content of inorganic ions in the serum, the cholesterol concentration, and the protein concentration in the blood, also the ratio of albumin to globulin in blood showed normal values. The character of the stool tested normal and the edema disappeared. Breathing became normal without the use of a diuretic or cardiac stimulants.

Having now fully described the invention, it will be apparent to one of ordinary skill in the art that many changes and modifications can be made thereto without departing from the spirit or scope of the invention as set forth herein. Accordingly,

What is claimed and desired to be covered by Letters Patent is:

1. A process for preparing a low sodium infant formula mixture which easily sinks in water and which reproduces a casein micelle liquid of a turbidity and heat stability similar to cow's milk, which comprises:

dissolving a potassium salt of an organic acid selected from the group consisting of citric acid, tartaric acid, succinic acid, and lactic acid and/or potassium polyphosphate selected from the group consisting of poly-metaphosphate and tetra-phosphate in an amount as determined by the formula:

$$\log y = 0.0384x + 0.70 \pm 0.25$$

wherein $y$ is the mg number of said potassium salt of said organic acid and/or potassium polyphosphate per 1 g of casein protein and $x$ is the mg number of said calcium ion per 1 g of casein protein, into a casein solution of 5 to 12% protein concentration obtained by dissolving an acid casein in an alkali solution containing potassium but substantially no sodium, mixing therewith a calcium salt solution with a concentration of 10 to 30 mg of calcium ion per 1 ml in an amount such that the quantity of calcium ion is 20 to 40 mg per 1 g of casein protein at a temperature of below 50°C, adjusting the pH of the resulting mixed solution to a value from 6.2 to 6.8 after subsequent preheating, gradually preheating the solution to a temperature of at least 65°C while stirring to form a casein micelle and adding an animal or vegetable fat, an emulsifier in amounts of 0.5 to 5% based on the higher content of either the protein or the fat in the final product and selected from the group consisting of glycerine fatty acid ester, sucrose fatty acid ester, sorbitan fatty acid ester, propylene glycol fatty acid ester, and soybean lecithin, and a carbohydrate selected from the group consisting of lactose, sucrose, malt dextrin, and mixtures thereof to the casein micelle liquid in amounts such that the sodium content of the final product does not exceed 100 mg per 100 g of final product, homogenizing pasteurizing, and concentrating the casein micelle liquid.

2. The process of claim 1, wherein the fat content is 23.2%, the protein content is 12.9%, the total carbohydrate, emulsifier and vitamin content is 60.2%, the ash content is 1.7%, the water content is 2.1%, and the ash composition is 22.7 mg of sodium, 272 mg of calcium, 720 mg of potassium, 28 mg of magnesium, 184 mg of phosphorous, and 565 mg of chlorine per 100 g of final product.

3. The process of claim 1, wherein the fat content is 23.1%, the protein content is 13%, the total carbohydrate, emulsifier and vitamin content is 60.0%, the ash content is 1.65%, the water content is 2.25%, and the ash composition is 48 mg of sodium, 275 mg of calcium, 574 mg of potassium, 28 mg of magnesium, 227 mg of phosphorous, and 562 mg of chlorine per 100 g of final product.

4. The process of claim 1, wherein said formula mixture is dried into a powder form.

5. The low sodium infant formula mixture produced by the process of claim 1.

6. The formula mixture of claim 5, wherein the casein micelle has a turbidity O.D. of 1.20–1.64.

* * * * *